April 23, 1946.          F. E. NOVY          2,398,849
POWER TRANSMISSION DEVICE
Filed Nov. 25, 1942

INVENTOR.
FRANK E. NOVY
BY Oberlin, Limbach & Day
ATTORNEYS

Patented Apr. 23, 1946

2,398,849

UNITED STATES PATENT OFFICE 2,398,849

POWER TRANSMISSION DEVICE

Frank E. Novy, Cleveland, Ohio

Application November 25, 1942, Serial No. 466,885

6 Claims. (Cl. 192—71)

This invention relates to improvements in, or relating to, rotary clutches of the type wherein two members mounted for relative rotation are provided with means, optionally operative, adapted to lock them and prevent such relative rotation. The object of the invention is to provide such means for clutching and declutching, using novel structure which is simpler and more sturdy than that heretofore used and which with greater efficiency may be cheaply made and assembled.

According to this invention a ring-like member encompasses a tube-like member in concentric rotative relation. The inner member has a plurality of dogging pins slidably mounted in a plurality of apertures spaced circumferentially in the wall thereof. In un-clutched relation, the outer ends of the dogging pins are held flush with the outer wall of the inner member and the inner ends project into the bore of the inner tube-like member. A circumferentially disposed recess is provided in the inner surface of the outer ring-like member into which one of the dogging pins may be projected to achieve a clutched relation between the members. The projection of such dogging pin is secured by introducing, between the inner ends of the dogging pins when in un-clutched relation, a cam element having a bearing surface defining a circle which is larger than the circle, defined by inner ends of the dogging pins and coaxial with the members. Such cam element is so mounted that the bearing surface may be shifted radially. The bearing surface of the cam element cannot be inserted between the inner ends of the dogging pins without displacing one of them, which is accomplished by its projection into the recess in the inner surface of the outer ring-like member.

To the accomplishment of the foregoing and related ends, said invention, then, consists of the means hereinafter fully described and particularly pointed out in the claims. The annexed drawing and the following description set forth in detail certain mechanism embodying the invention, such disclosed means constituting, however, but a preferred embodiment of the various mechanical forms in which the principle of the invention may be used.

Figure 1:
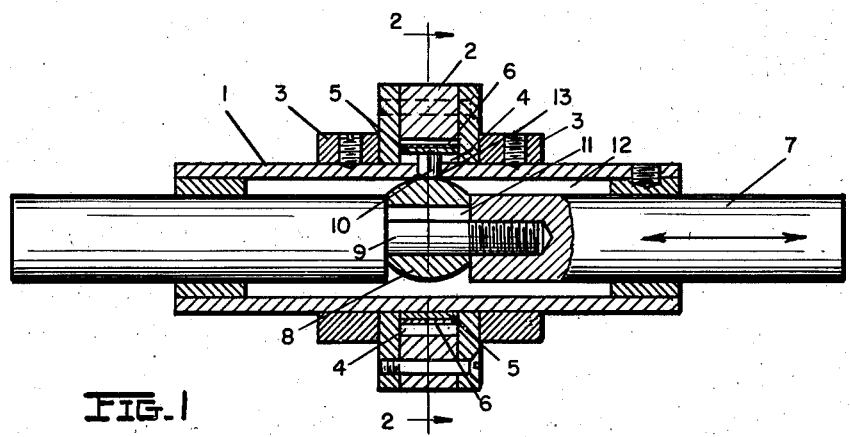
Figure 2:
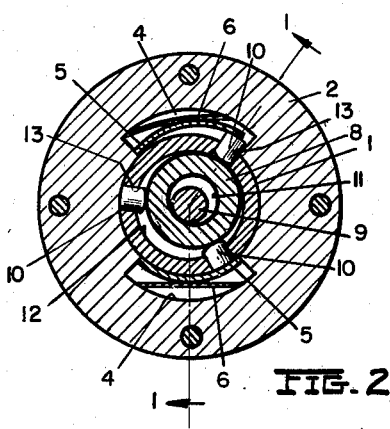
Figure 3:
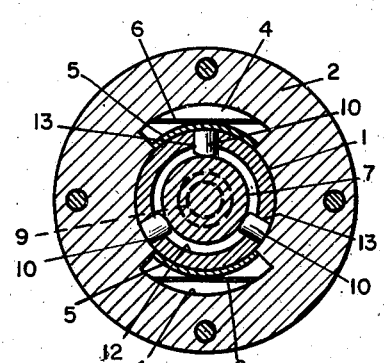
Figure 4:
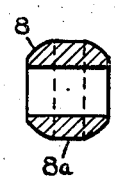
Figure 5:
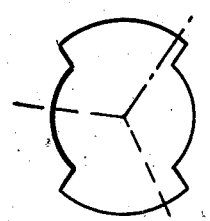

In said annexed drawing:

Fig. 1 is a longitudinal view of said embodiments substantially in section; Fig. 2 is a transverse sectional view of Fig. 1 on the line 2—2 showing the embodiment when in clutched relation; Fig. 3 is the same as Fig. 2 when in un- clutched relation; Fig. 4 is a section of a detail corresponding with the section of Fig. 1 by showing a modification in construction; and Fig. 5 is a diagrammatic view corresponding with the sectional view of Fig. 2 showing more clearly the relation of certain parts when in clutched relation.

Referring to the drawing, a preferred embodiment comprises a tube-like member 1, upon which a ring-like member 2 is mounted in rotatable relation. Ring-like member 2 is held in place longitudinally of tube-like member 1 by fixedly secured collars 3. In diametrically opposite points of the inner surface of the ring-like member 2 are two circumferentially extended recesses 4. In the opening of each recess 4 is an arcuate shaped plate 5 curved to fit the circumference of the tube-like member 1. Within each recess 4 is a flat spring 6, bearing upon the plate 5 and urging it into contact with the surface of tube-like member 1.

Through the wall of tube-like member 1 are three apertures 13, equally spaced in circumferential relation and in registry with the recesses 4. In each of the apertures 13 is a locking piece in the form of a dogging pin 10, which is of a length such that when its outer end is flush with the outer surface of the tube-like member 1, the inner end will project into the bore 12 of tube-like member 1, as is best seen in Fig. 3, the several pins being of equal length.

Longitudinally and reciprocably mounted through the bore 12 of the tube-like member 1 is a shaft, or rod, 7 which is coaxial with members 1 and 2. The circumference of rod 7 is substantially the same as the coaxial circle defined by the inner ends of dogging pins 10. Intermediate the rod 7 and defined between planes normal to the axis of rod 7 is a section 9, of substantially reduced diameter. Mounted on this reduced section 9 is a cam element 8, having the shape of a flattened sphere, with a bore 11 between the flattened faces. The bore 11 has a diameter smaller than the diameter of the rod 7, but substantially larger than the diameter of the reduced section 9.

When the described device is in un-clutched relation the several parts will be in a position as shown in Fig. 3 with the rod 7 contacting and supporting the dogging pins 10. When the rod 7 is shifted the cam element 8 will contact the pins 10 and being larger than the circle defined thereby will force one of the pins outwardly into a recess 4 as shown in Figs. 1 and 2. The device will now be in clutched position and cam element 8 has shifted radially and maintains an off-center position in relation to rod 7 and members 1 and 2. On again shifting the rod 7 to unclutch the device, the cam element 8 will be withdrawn from contact with the dogging pins 10 and they will rest upon the surface of rod 7. When the pin 10 is forced from the recess 4 the spring 6 therewithin will move the plate 5 into contact with the outer surface of tube-like member 1, closing the opening of recess 4, and providing a continuous path for contact with the outer ends of dogging pins 10 during relative rotation of members 1 and 2.

The transverse curvature of cam element 8 in some cases may be desirably modified to include a flat (or rather a cylindrical) section 8a as shown in Fig. 4. This section which corresponds with the largest diameter of the element when brought in contact with the pins 10 will tend to remain in engagement therewith, i. e. the rod 7 will remain where set without necessarily being locked in place.

The angular disposition of the end walls of the recesses 4 wherewith the pins 10 engage as shown in Figs. 2 and 3 is such that the walls incline from a radial line, i. e. converge slightly towards each other. This arrangement facilitates locking engagement of the pins with the recesses but the former obviously will not have as complete contact as where the end walls are substantially radial so that the pins will engage therewith throughout the extent to which they project into the recess. This disposition of walls is illustrated in the diagrammatic Figure 5. The end walls of the recesses instead of converging may flare outwardly with respect to each other in which case disengagement of the pins from the recesses would be facilitated.

From the foregoing description it will be seen that not only is my improved transmission or power device and clutch simple in construction and operation, but that the parts are correspondingly easy to manufacture and assemble. Of particular importance is the fact that due to the arrangement of the recesses 4 and dogging pins 10 circumferentially of the respective members of the device, whichever of such members serves as the driving member, immediate engagement therebetween is effected when the cam part 8 is shifted longitudinally. In other words, the relation of such recesses and pins is such that one of the dogging pins will always be in position to be forced outwardly into a recess by the lateral displacement of the cam element due to the fact that one or both of the remaining pins is not at the time adjacent a recess. Provided this relationship of recesses and pins is preserved the number of each thereof may be increased if desired as in the case of a device of large size, designed for the transmission of more power than in the case of the device chosen for purpose of illustration.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a rotary clutch as described having a tube-like member, a ring-like member mounted rotatably thereabout, said members having a common axis, and means operative optionally to lock such members and prevent relative rotation therebetween, the improved locking means comprising two limited recesses circumferentially disposed in the inner surface of the ring-like member in diametrical relation; curved plates, one of which is positioned in the opening of each said recess, which plates fit the outer surface of the tube-like member; springs in said recesses urging said plates into contact with the tube-like member; three apertures equally spaced in circumferential relation through the wall of the tube-like member and in register with the said two recesses; dogging pins fitted in said apertures, said pins having equal lengths such that each will project into the bore of the tube-like member when its outer end contacts the inner surface of the ring-like member; a shifting rod mounted through said tube-like member for reciprocal movement longitudinally and having a common axis therewith, said rod having a diameter such that its surface will engage the inner ends of said pins when their outer ends are in contact with the inner surface of the ring-like member; a limited section in said rod, having a diameter substantially less than the diameter of said rod; and a bored camming element mounted on said limited section spanning same, said element having a bore of a diameter substantially greater than the diameter of said limited section but less than the diameter of said rod, and having a bearing surface defining a sphere the diameter of which is larger than the diameter of said rod by substantially the length of the distance which one of said pins projects into the bore of the tube-like member when in retracted position.

2. In a rotary clutch as described having a tube-like member, a ring-like member mounted rotatably thereabout, said members having a common axis, and means operative optionally to lock such members and prevent relative rotation therebetween, the improved locking means comprising a limited recess circumferentially disposed in the inner surface of the ring-like member; a curved plate positioned in the opening of said recess, which plate fits the outer surface of the tube-like member; a spring in said recess urging said plate into contact with the tube-like member; a plurality of apertures equally spaced in circumferential relation through the wall of the tube-like member and in register with the said circumferential recess; dogging pins fitted in said apertures, said pins having equal length such that each will project into the bore of the tube-like member when its outer end contacts the inner surface of the ring-like member; a shifting rod mounted through said tube-like member for reciprocal movement longitudinally and having a common axis therewith, said rod having a diameter equal to the concentric circle defined by the inner ends of said pins when their outer ends are in contact with the inner surface of the ring-like member; a limited section in said rod, having a diameter substantially less than the diameter of said rod; and a bored camming element mounted on said limited section spanning same, said element having a bore of a diameter substantially greater than the diameter of said limited section but less than the diameter of said rod, and having a bearing surface defining a sphere the diameter of which is larger than the diameter of said rod by substantially the length of the distance which one of said pins projects into the bore of the tube-like member when in retracted position.

3. A rotary clutch comprising a ring-like member provided on its inner surface with a limited recess circumferentially extended; a curved plate positioned in said recess; means resiliently urging said plate to a position closing the opening of said recess; a tube-like member rotatably and coaxially mounted through said ring-like member in fixed bearing relation therewith; a plurality of apertures, equally spaced in circumferential relation through the wall of said tube-like member and in register with said extended recess; dogging pins in said apertures, said pins being of an equal length such that the inner ends will extend into the bore of said tube-like member when the outer ends are in contact with the inner surface of said ring-like member; means operative to slidably support said pins in said relation; and a camming element within said tube-like member, operative, when moved into contact with the inner ends of said pins, to urge one of said pins to a position projecting into said recess, said element being provided with a zone-like bearing surface which defines a sphere having a diameter greater than the diameter of the circle, defined by the inner ends of said pins, co-axial with the said members.

4. In a device of the character described, the combination of driving and driven members, one normally rotatable upon the other, the outer member having a plurality of circumferentially spaced recesses in its inner face, spring-pressed plates normally closing such recesses, a plurality of radially movable pins carried by the inner member and individually adapted when forced outwardly to engage one of said recesses, a longitudinally shiftable rod within said inner member, and a bored camming element carried by said rod, the bore of said element being substantially larger than the section of said rod whereon it is mounted, so as to permit displacement of said element transversely of said rod, and the outer face of said element being contoured to engage and actuate one of said pins when said element is longitudinally shifted along with said rod.

5. In a device of the character described, the combination of driving and driven members, one normally rotatable upon the other, the outer member having two oppositely disposed recesses in its inner face, spring-pressed arcuate plates normally closing such recesses, three equidistantly spaced, radially movable pins carried by the inner member and individually adapted when forced outwardly to engage one of said recesses, a longitudinally shiftable rod within said inner member, and a bored camming element carried by said rod, the bore of said element being substantially larger than the section of said rod whereon it is mounted, so as to permit displacement of said element transversely of said rod, and the outer face of said element being contoured to engage and actuate one of said pins when said element is longitudinally shifted along with said rod.

6. In a device of the character described, the combination of driving and driven members, one normally rotatable upon the other, the outer member having a plurality of circumferentially spaced recesses in its inner face, a plurality of radially movable locking pieces carried by said inner member and individually adapted when forced outwardly to engage one of said recesses, means normally retaining said pieces against such engagement, a longitudinally shiftable rod within said inner member, and a bored camming element carried by said rod, the bore of said element being substantially larger than the section of said rod whereon it is mounted, so as to permit displacement of said element transversely of said rod, and the outer face of said element being contoured to engage and actuate one of said pieces when said element is longitudinally shifted along with said rod.

FRANK E. NOVY.